United States Patent
Grzelka et al.

(10) Patent No.: US 12,167,446 B2
(45) Date of Patent: Dec. 10, 2024

(54) METHOD AND A SYSTEM FOR ACCESSING A WIRELESS CHANNEL IN A DENSE ENVIRONMENT

(71) Applicant: Advanced Digital Broadcast S. A., Bellevue (CH)

(72) Inventors: Piotr Grzelka, Zielona Gora (PL); Adam Macugowski, Zielona Gora (PL)

(73) Assignee: ADVANCED DIGITAL BROADCAST S.A., Bellevue (CH)

( * ) Notice: Subject to any disclaimer, the term of this patent is extended or adjusted under 35 U.S.C. 154(b) by 374 days.

(21) Appl. No.: 17/687,770

(22) Filed: Mar. 7, 2022

(65) Prior Publication Data
US 2023/0053510 A1 Feb. 23, 2023

(30) Foreign Application Priority Data
Aug. 19, 2021 (EP) .................................... 21192172

(51) Int. Cl.
*H04W 74/02* (2009.01)
*H04W 60/00* (2009.01)

(52) U.S. Cl.
CPC .......... *H04W 74/02* (2013.01); *H04W 60/00* (2013.01)

(58) Field of Classification Search
CPC . H04W 74/02; H04W 60/00; H04W 74/0808; H04W 72/0446
See application file for complete search history.

(56) References Cited

U.S. PATENT DOCUMENTS

| | | | |
|---|---|---|---|
| 2014/0056205 A1* | 2/2014 | Aboul-Magd | H04W 72/27 370/312 |
| 2018/0199375 A1* | 7/2018 | Nezou | H04W 74/0816 |
| 2020/0404708 A1* | 12/2020 | Zhang | H04W 72/23 |
| 2021/0058968 A1* | 2/2021 | Xue | H04L 5/0092 |
| 2022/0225343 A1* | 7/2022 | Han | H04W 72/1215 |
| 2022/0353123 A1* | 11/2022 | Kim | H04L 27/2605 |
| 2024/0073838 A1* | 2/2024 | Lu | H04W 74/085 |

FOREIGN PATENT DOCUMENTS

JP 2023146423 A * 10/2023

* cited by examiner

*Primary Examiner* — Deepa Belur
(74) *Attorney, Agent, or Firm* — Rivka Friedman

(57) ABSTRACT

A method for accessing a wireless channel by a device (112, 113) that intends to transmit data, wherein access to channel is controlled by a wireless channel controller (111), the method comprising: registering the device (112, 113) at the wireless channel controller (111) as an authorized device; synchronizing (201) a timer of the device (112, 113) indicating time windows; determining (202) a designated time window during which the device (112, 113) can transmit data; performing (203) a clear channel assessment procedure during the preceding time window such that the clear channel assessment ends at the end of the time window preceding the designated time window; and beginning transmission (204) of data at the beginning of the designated time window.

4 Claims, 6 Drawing Sheets

METHOD AND A SYSTEM FOR ACCESSING A WIRELESS CHANNEL IN A DENSE ENVIRONMENT

TECHNICAL FIELD

The present invention relates to wireless systems, in particular to controlling wireless channel access, useful in particular to improve channel access in dense environment.

BACKGROUND

Wi-Fi networks become more and more popular, with more and more devices operating in vicinity to each other. This often causes collisions between attempts to use the wireless channel between these devices. The collisions deteriorate the overall effective channel throughput.

Currently, RLAN (Radio Local Area Network) regulatory force to implement a Channel Access Mechanism (Adaptivity) to avoid collision in shared radio band. In all the units on the market it is implemented to meet regulatory standard. Due to random nature of channel occupancy of each device in range, and random point in time when the device is trying to access the medium, in dense wireless environment the channel utilization is not efficient due to high number of transmission (TX) collisions and contention among the devices about channel access. Especially, when two or more access point (AP) devices are in the TX range, co-channel interference occurs, leading to problems with reliable data transfer. This is especially problematic in time-sensitive broadcasts, such as video broadcast.

There are known prior art attempts to avoid collisions. For example, EP3183933 discloses a method of controlling transmission in a communication network, the method comprising: a communication device (AP/STA) detecting potentially colliding usage of transmission resources; the communication device (AP/STA) detecting cease of the potentially colliding usage of the transmission resources; after expiry of a backoff time period starting when detecting said cease of said usage of the transmission resources, the communication device (AP/STA) performing a transmission on the transmission resources synchronously with a further transmission on the transmission resources by at least one other communication device (AP/STA); and the communication device (AP/STA) receiving control information for synchronizing the transmission with the further transmission.

SUMMARY

There is a need to further develop channel control methods in order to allow efficient channel usage.

The object of the invention is a method for accessing a wireless channel by a device that intends to transmit data, wherein access to channel is controlled by a wireless channel controller, the method comprising: registering the device at the wireless channel controller as an authorized device; synchronizing a timer of the device indicating time windows; determining a designated time window during which the device can transmit data; performing a clear channel assessment procedure during the preceding time window such that the clear channel assessment ends at the end of the time window preceding the designated time window; and beginning transmission of data at the beginning of the designated time window.

The method may further comprise, in case the transmission of data does not occupy the full length of the designated time window, transmitting dummy data till the end of the designated time window.

The method may further comprise, in case the transmission of data requires time longer than the length of the designated time window, requesting that another device transmits dummy data during beginning of a next designated time window, performing a clear channel assessment procedure during the preceding time window such that the clear channel assessment ends at the end of the time window preceding the next designated time window and beginning transmission of data at the beginning of the next designated time window.

The object of the invention is also a device configured to operate according to the method as described herein.

The object of the invention is also a wireless system comprising a wireless channel controller and a plurality of authorized devices configured to operate according to the method as described herein.

The method of the invention allows to utilize the wireless medium more efficiently. Firstly, by minimizing number of wireless collisions between each other. Secondly, by taking control over the medium to limit third party access, external interferers are avoided. The devices using the presented method are compliant with regulatory requirements related to test of adaptivity, where every transmitted frame should be preceded by CAC (Channel Availability Check) and then transmission is only allowed when the medium is free. Therefore, the presented method can co-exist with the traditional, standardized wireless access mechanism.

Notation and Nomenclature

Some portions of the detailed description which follows are presented in terms of data processing procedures, steps or other symbolic representations of operations on data bits that can be performed on computer memory. Therefore, a computer executes such logical steps thus requiring physical manipulations of physical quantities.

Usually these quantities take the form of electrical or magnetic signals capable of being stored, transferred, combined, compared, and otherwise manipulated in a computer system. For reasons of common usage, these signals are referred to as bits, packets, messages, values, elements, symbols, characters, terms, numbers, or the like.

Additionally, all of these and similar terms are to be associated with the appropriate physical quantities and are merely convenient labels applied to these quantities. Terms such as "processing" or "creating" or "transferring" or "executing" or "determining" or "detecting" or "obtaining" or "selecting" or "calculating" or "generating" or the like, refer to the action and processes of a computer system that manipulates and transforms data represented as physical (electronic) quantities within the computer's registers and memories into other data similarly represented as physical quantities within the memories or registers or other such information storage.

A computer-readable (storage) medium, such as referred to herein, typically may be non-transitory and/or comprise a non-transitory device. In this context, a non-transitory storage medium may include a device that may be tangible, meaning that the device has a concrete physical form, although the device may change its physical state. Thus, for example, non-transitory refers to a device remaining tangible despite a change in state.

BRIEF DESCRIPTION OF DRAWINGS

The present invention will be shown by means of example embodiments on a drawing, wherein.

DETAILED DESCRIPTION OF EMBODIMENTS

The present invention relates in general to Wi-Fi networks as defined by the IEEE 802.11 family of standards. It is also applicable to any other wireless networks that share similar channel access rules, such as Bluetooth, ZigBee, LoRa, Thread and Z-Wave.

Figure 1:
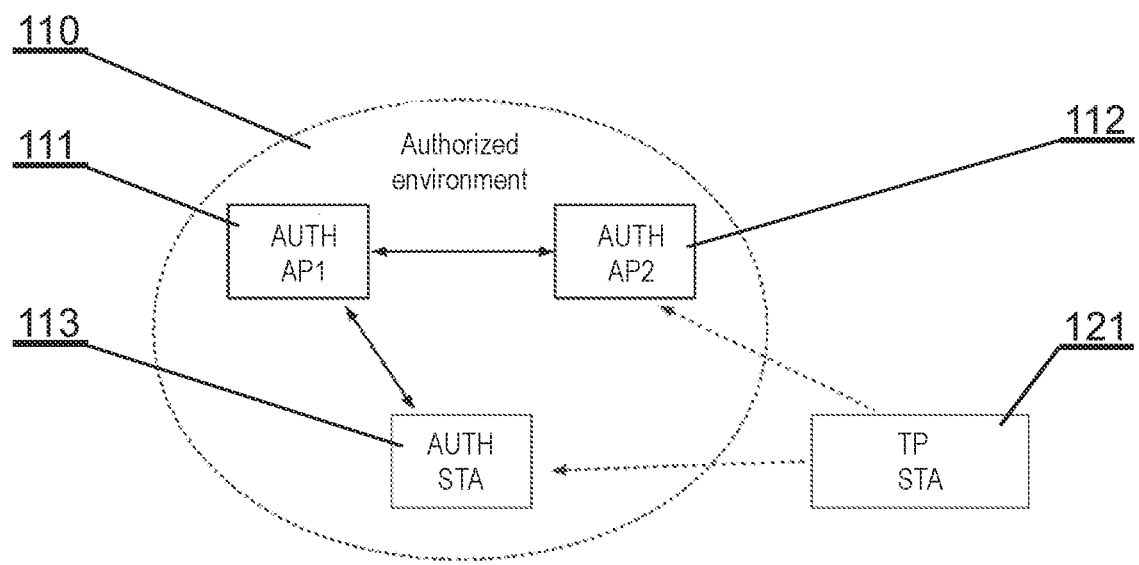
FIG. 1 shows an example topology of a Wi-Fi infrastructure.

A FIG. 1 shows an example topology of a Wi-Fi infrastructure. The infrastructure comprises an authorized (AUTH) environment 110 that includes devices 111-113 that are authorized to communicate within the system of the present invention and third-party environment that includes third-party (TP) devices 121 that are not authorized to communicate within the system of the present invention. For example, in a hotel facility the authorized environment 110 can include the hotel devices such as tv sets, set-top boxes, access points, repeaters, security devices, sensors etc. that should have privileged access to the wireless network such as to facilitate smooth operation of the hotel facility. For example, the authorized environment 110 may contain:

- a wireless channel controller 111 (AP1), which role is to coordinate remaining authorized devices by synchronizing and managing traffic in the system;
- at least one wireless system extender 112 (AP2), which, apart from the base role of a range extender, is used to help the wireless controller in spectrum utilization, preventing from co-channel interferers;
- at least one system client 113 (STA), which is the client device that is capable of transmitting traffic in a synchronized manner on the AP1 or AP2 request.

The third-party devices 121 are transmitters that compete with the other devices for media access, treated by the authorized system devices as co-channel interferers.

Figure 2:
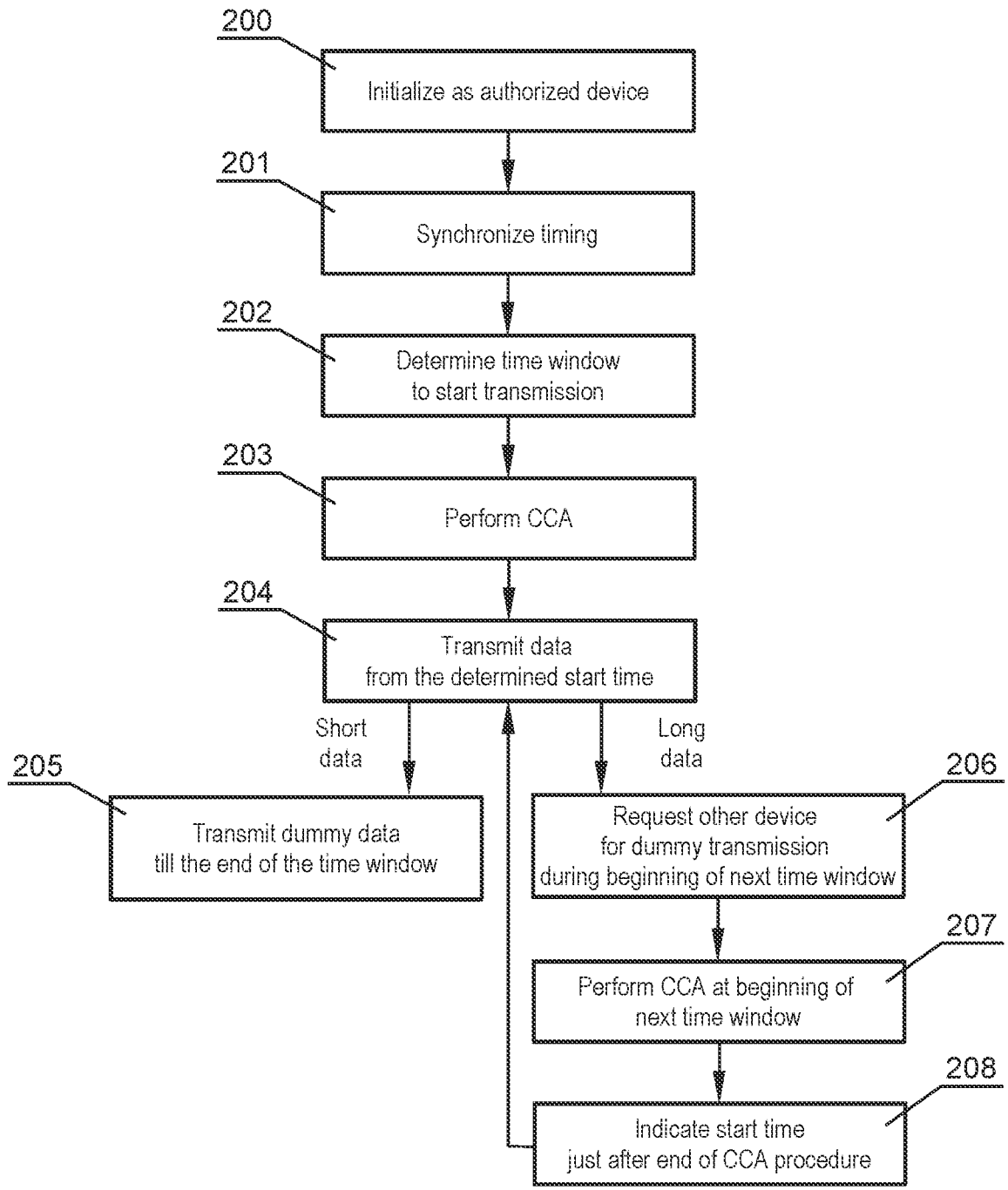
FIG. 2 shows a procedure for accessing the channel by each authorized device within the system.

FIG. 2 shows a procedure for controlling the channel access at each authorized device within the system.

First, in step 200, the device may initialize itself within the wireless transmission system, by sending a request to the wireless channel controller 111 (AP1) to be recognized as an authorized device. The wireless channel controller 111 (AP1) may be configured to store a list of authorized device identifiers, and the other devices may request to be added to the list by sending a specific identifier that authenticates them as an authorized device.

In step 201, time is synchronized among all authorized devices 111-113 within the area of range of the authorized environment. For example, this can be done via a Short Control Signaling Transmission, which does not need Clear Channel Assessment (CCA) mechanism. In order to synchronize time, the wireless channel controller 111 (AP1) may send timestamps generated based on its own clock. The timestamp is included into data frame transmission or, in case no valid data is waiting to be sent to the system clients, in control frames. From now on, each authorized device 111-113 is able to transmit wireless data only in synchronized time windows. A time window is defined by standard as Channel Occupancy Time value, it is the total time during which device transmits without need of re-evaluating the channel availability.

Next, once the device is time-synchronized, in step 202 it determines a designated time window at which it can transmit data. For example, the device sends a request for data transmission to the wireless channel controller 111 and asks for indication of the designated time window number in which it can transmit.

Next, shortly before the beginning of the designated time window, in step 203 a CCA procedure is performed as required by wireless channel regulations. The timing of the window can be precisely determined due to timing synchronization between the devices. During the CCA an authorized device transmission is determined, and the device can start transmission immediately after it ends, wherein the end of transmission is supposed to be effected at the end of the current time window. In step 204 the device transmits its data starting at the beginning of the designated time window determined in step 203.

In case the transmission is to be short, i.e. it takes less than the length of the designated time window, dummy data (such as zeroes, random numbers or a predefined sequence) is transmitted in step 205 immediately after the end of transmission of the desired data, in order to fully occupy the designated time window, such that if a third-party device 121 performs the CCA procedure it detects that the channel is busy.

In case the transmission is to be long, i.e. it takes more than the length of the designated time window, a request is sent in step 206 for another authorized device to fill the beginning of the subsequent time window with dummy data (such as zeroes, random numbers or a predefined sequence) and in step 207 a CCA procedure is performed to comply with the regulatory rules that require CCA before transmission. The request is sent to the wireless channel controller 111 and the wireless channel controller 111 selects the other authorized device to transmit the dummy data, for example sequentially from the list of authorized devices. The transmission is scheduled by wireless controller. During the CCA, if the dummy data transmission is detected as expected, the device can start transmission of the remaining data in step 208 immediately at the end of the dummy data transmitted (wherein the length of this data is selected such that its transmission covers a time necessary for the requesting device to perform its CCA procedure and therefore, due to time synchronization, the device knows when the channel can be used to resume transmission). Steps 206-208 can be performed for as long as necessary to transmit all data. Since the other authorized device transmits dummy data while the current device performs the CCA, then if a third-party device 121 performs the CCA procedure it detects that the channel is busy.

Therefore, when the authorized devices transmit data, the channel is always busy and non-accessible to third-party devices (i.e. each time the third-party device 121 performs its CCA procedure it detects a signal of one of the authorized devices and refrains from transmitting). Since the authorized devices are time-synchronized, they do not interfere with each other and the channel bandwidth is much more efficiently used, since there are no TX interferences (or at least the interferences are significantly reduced).

The system shall be always kept synchronized, even when no data is transmitted by any of the authorized devices, or when it is waiting until third party devices finish their own transmission.

In case an authorized device wants to access the medium in an asynchronous manner (e.g. after the third party device releases the medium), the transmission stops before next synchronization period begins, and starts a new frame transmission in synchronous manner.

Figure 3:
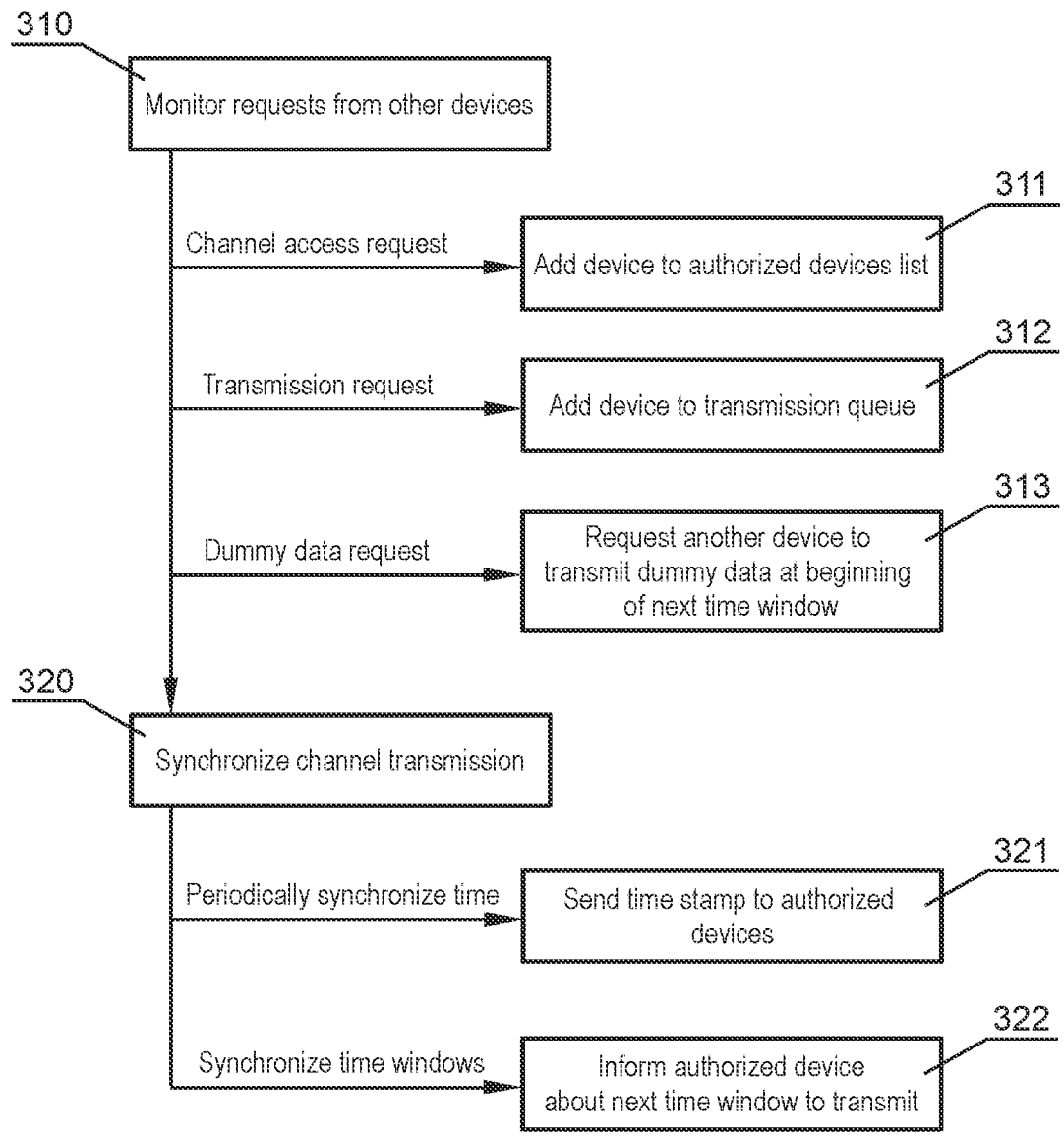
FIG. 3 shows a procedure for controlling the channel access by a wireless channel controller.

FIG. 3 shows a procedure for controlling the channel access by a wireless channel controller. It performs two main actions: monitoring 310 the wireless channel for requests from other devices and performing 320 periodic activities. Upon receipt of a channel access request in step 311 from another device, the wireless channel controller checks whether the device is authorized (e.g. if the device has an authorized number or a specific identifier has been sent in the request) and if so, it adds the device to authorized devices list. Upon receipt of a transmission request in step 312 from an authorized device, the wireless channel controller adds the device to a transmission queue, which is then used in step 322. If the authorized device intends to send large amount of data, it may indicate the number of time windows necessary to send data, or send a separate request for each time window that is required for transmission. The transmission queue can be arranged in order of receipt of requests or in order of relevance of authorized devices or data to be transmitted (i.e. when requesting a time window access, the authorized device may indicate a level of data priority for transmission). Upon receipt of a dummy data request from an authorized device in step 313, the wireless channel controller sends a request to another device to initiate transmission of dummy data at the beginning of the next time window. Alternatively, the system can be configured such that the dummy data request is not sent by the authorized device in step 206, but the wireless channel controller may itself realize that the authorized device will need to generate the CCA at the beginning of the time window and request dummy data transmission by another device without specific request of step 206. As a periodic task, in step 321, the wireless channel controller sends a time stamp to all authorized devices such as to synchronize the timing. Furthermore, in step 322, the wireless channel controller sends to authorized devices information about the next time window at which they can transmit their data, so that this information can be received in step 203 of the procedure of FIG. 2.

Figure 4:
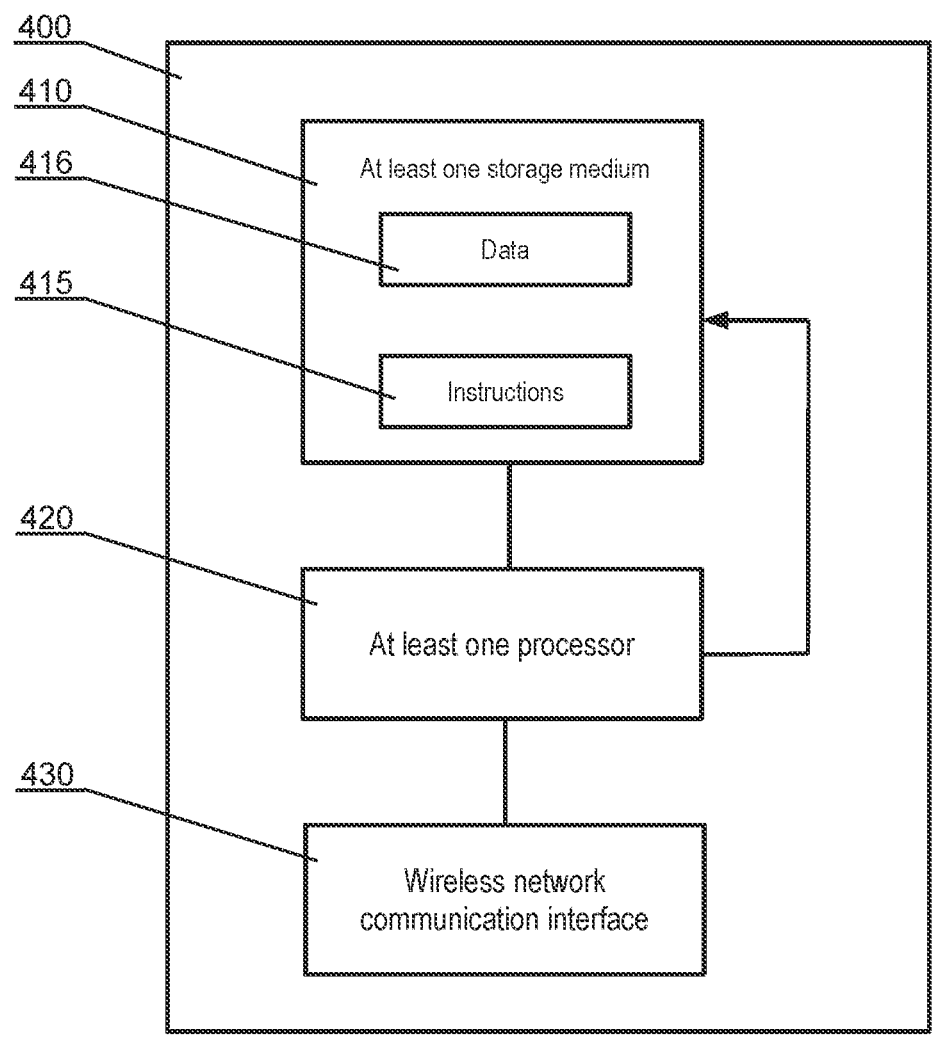
FIG. 4 shows a structure of a device that can operate within the system.

FIG. 4 shows a structure of a wireless channel controller 111, extender 112 or client 113 device that can operate within the system. The device 400 may include at least one nontransitory processor-readable storage medium 410 that stores at least one of processor-executable instructions 415 or data 416; and at least one processor 420 communicably coupled to the at least one nontransitory processor-readable storage medium 410. The data 416 may include the list of authorized devices in the system (stored at the wireless channel controller and/or at other devices) and configuration parameters, such as the timing synchronization data and parameters of time window (e.g. a length of the time window). A wireless network communication interface 430 is used to access the wireless channel. The at least one processor 420 is configured to (by executing the instructions 415 and reading the data 416) perform the method of FIG. 2 or 3.

Figure 5:
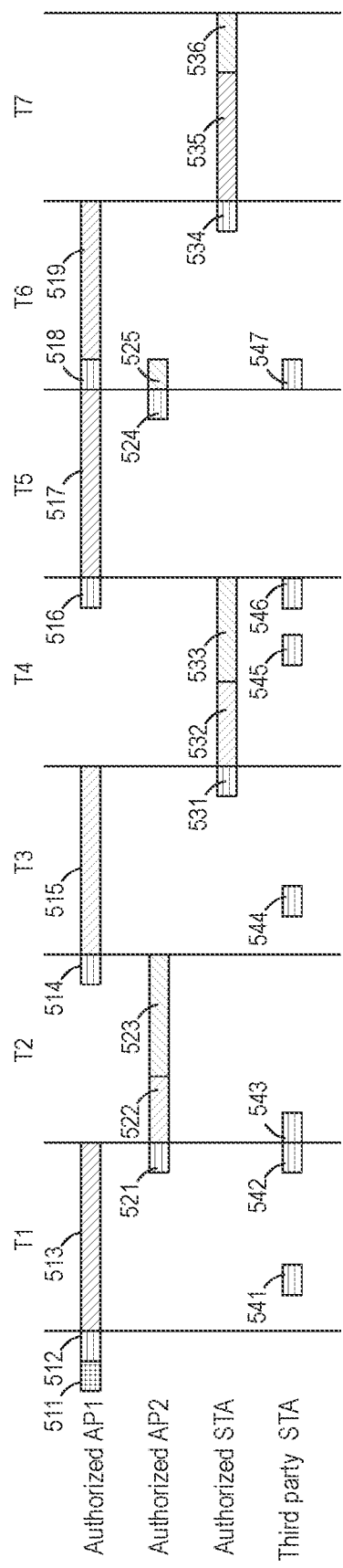
FIG. 5 shows a first example of a communication in a wireless channel with controlled access.

FIG. 5 shows a first example of a communication in a wireless channel with controlled access. Initially (511), the wireless channel controller 111 (AP1) synchronizes time with all authorized devices in the system. Next, the wireless channel controller AP1 performs CCA procedure (512) just before the time window T1 in which it intends to send data and upon successful check that the channel is not occupied by other devices, it sends data (513) during time window T1. In the meantime, authorized AP2 has asked for access to channel, therefore AP1 sends to AP2 information that AP2 can transmit in time window T2. Therefore, shortly before start of T2, AP2 performs CCA procedure (521) and upon successful check that the channel is not occupied by devices other than AP1 (which is known to finish its transmission upon the end of T1), AP2 starts to transmit data (522) at the beginning of time window T2. After the main payload (522) of the data is ended, AP2 starts to transmit dummy data (523) such as to fill the whole window T2 to disable access for other devices. In a similar manner data is then sent in time window T3 by AP1 (515), time window T4 by authorized STA (532, 533), time window T5 by AP1 (517), time window T6 by AP1 (519) and time window T7 by authorized STA (535, 536), each transmission being preceded by CCA (514, 531, 516, 518, 534). When AP1 performs CCA (518) at the beginning of time window T6, AP2 is instructed to send dummy data (525, preceded by CCA 524) during this check so that the channel is not taken over by any third party device, therefore when the third party STA performs CCA (547) it can see that the channel is busy. Therefore, any time the third party STA performs CCA (541-547), the channel is busy and that third party STA cannot transmit.

Figure 6:
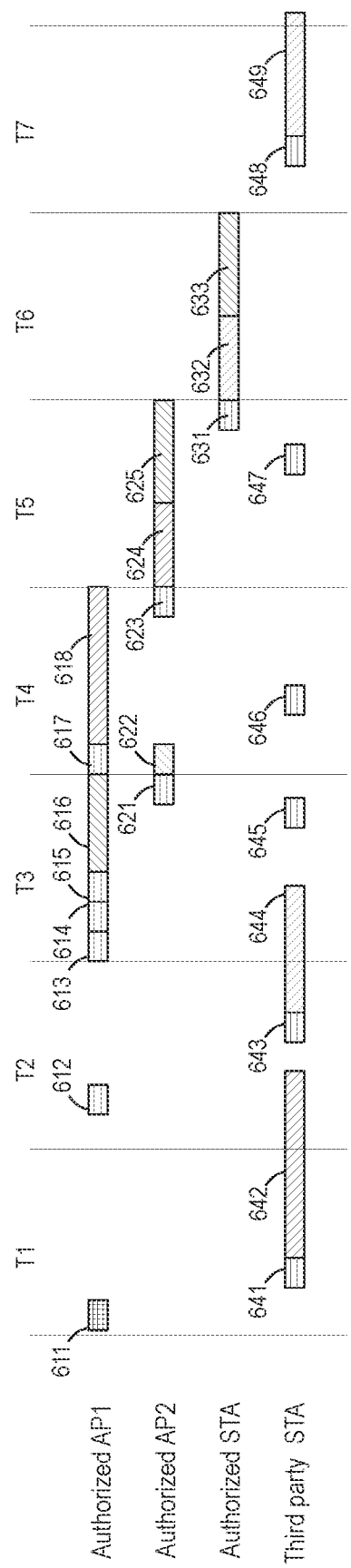
FIG. 6 shows a second example of a communication in a wireless channel with controlled access.

FIG. 6 shows a second example of a communication in a wireless channel with controlled access. Initially (611), the wireless channel controller 111 (AP1) synchronizes time with all authorized devices in the system. The channel is occupied by a transmission (642, 644 preceded by CCA 641, 643) from a third-party STA. Therefore, when AP1 performs the first CCA (612), it detects an occupied channel. AP1 continues the CCA procedure (613-615) until it detects that the channel is unoccupied, then it starts transmitting dummy data (616) until the end of the time window. Next, if AP1 intends to transmit data, it requests AP2 to occupy the channel at the beginning of the next time window T4 (622, preceded by CCA 621) while AP1 performs CCA procedure (617) before transmission of data (618). As the channel is now reserved for the system, the authorized devices may transmit in subsequent time windows T5 (624-625) and T6 (632-633), preceded by CCA (623, 631). The channel is seen by the third-party STA as occupied upon its CCA procedures (645-647), as long as the authorized devices transmit. Only after the authorized devices stop their channel occupancy, the third party STA can transmit (649, preceded by CCA 648).

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

The invention claimed is:

1. A method for accessing a wireless channel by a device that intends to transmit data, wherein access to channel is controlled by a wireless channel controller, the method comprising:
   registering the device at the wireless channel controller as an authorized device;

synchronizing a timer of the device indicating time windows;

determining a designated time window during which the device can transmit data;

performing a clear channel assessment procedure during the preceding time window such that the clear channel assessment ends at the end of the time window preceding the designated time window;

beginning transmission of data at the beginning of the designated time window; and in case the transmission of data requires time longer than the length of the designated time window, requesting that another device transmits dummy data during beginning of a next designated time window, performing a clear channel assessment procedure during the preceding time window such that the clear channel assessment ends at the end of the time window preceding the next designated time window and beginning transmission of data at the beginning of the next designated time window.

2. The method according to claim 1, further comprising, in case the transmission of data does not occupy the full length of the designated time window, transmitting dummy data till the end of the designated time window.

3. A device configured to operate according to the method of claim 1.

4. A wireless system comprising a wireless channel controller and a plurality of authorized devices configured to operate according to the method of claim 1.

* * * * *